(12) United States Patent
Moyer

(10) Patent No.: US 6,804,768 B2
(45) Date of Patent: Oct. 12, 2004

(54) PROGRAMMABLE MICROPROCESSOR CACHE INDEX HASHING FUNCTION

(75) Inventor: Paul J Moyer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 10/123,755

(22) Filed: Apr. 15, 2002

(65) Prior Publication Data

US 2003/0196026 A1 Oct. 16, 2003

(51) Int. Cl.[7] .............................................. G06F 12/00
(52) U.S. Cl. ....................... 711/216; 711/102; 711/103; 365/185.01; 365/185.1; 365/189.01
(58) Field of Search ................................ 711/216, 102, 711/103; 365/185.01, 185.1, 189.01; 707/1, 3, 10

(56) References Cited

U.S. PATENT DOCUMENTS

| | | | |
|---|---|---|---|
| 5,117,133 A | | 5/1992 | Luebs |
| 5,530,958 A | * | 6/1996 | Agarwal et al. ................ 711/3 |
| 5,920,900 A | | 7/1999 | Poole et al. |
| 6,173,384 B1 | * | 1/2001 | Weaver ....................... 711/216 |
| 6,253,285 B1 | * | 6/2001 | Razdan et al. .............. 711/118 |
| 6,275,919 B1 | * | 8/2001 | Johnson ....................... 711/216 |
| 6,449,613 B1 | * | 9/2002 | Egolf et al. ..................... 707/7 |
| 6,560,599 B1 | * | 5/2003 | Boa et al. ....................... 707/7 |
| 6,690,667 B1 | * | 2/2004 | Warren ........................ 370/389 |
| 2003/0182608 A1 | * | 9/2003 | Hill et al. .................... 714/723 |

* cited by examiner

Primary Examiner—Matthew Kim
Assistant Examiner—Zhuo H. Li
(74) Attorney, Agent, or Firm—John Pessetto

(57) ABSTRACT

An embodiment of the invention provides a circuit and method for optimizing an index hashing function in a cache memory on a microprocessor. A programmable index hashing function is designed that allows the index hashing function to be programmed after the microprocessor has been fabricated. The index hashing function may be "tuned" by running an application on the microprocessor and observing the performance of the cache memory based on the type of index hashing function used. The index hashing function may be programmed by several methods.

8 Claims, 2 Drawing Sheets

PROGRAMMABLE MICROPROCESSOR CACHE INDEX HASHING FUNCTION

FIELD OF THE INVENTION

This invention relates generally to electronic circuits. More particularly, this invention relates to integrated electronic circuits and cache memory.

BACKGROUND OF THE INVENTION

Hashing is the transformation of a string of characters into a usually shorter fixed-length value or key that represents the original string. Hashing may be used to index and retrieve items in a database or a memory hierarchy because it is usually faster to find the item using the shorter hashed key than to find it using the original value. It may also be used in many encryption algorithms.

The hashing algorithm is called a hash function. The hash function is used to index the original value or key and then used later each time the data associated with the value or key is to be retrieved. A good hash function also should not produce the same hash value from two different inputs. If it does, this is known as a "collision". A hash function that offers an extremely low risk of collision may be considered acceptable.

If a collision occurs, another function may be used. This function is commonly called a "collision rule." The collision rule generates a succession of locations until one is found that is not in use already.

It is desirable, for efficiency reasons, to have as few collisions as possible. To achieve this, the hash function should not be pre-disposed to favor any one particular location or set of locations. In other words, it should spread the potential keys around the table as evenly as possible. This is normally done by making the hash function depend on all parts of the key, computing a large integer from the key, dividing this integer by the table size, and using the remainder as the hash function value. Other commonly used hash functions are the "folding" method, the "radix transformation" method, and "digit rearrangement" method. The type of hash function used is dependent on the application it is designed for.

A hashing function may be designed for indexing memory addresses to cache memory. Designing such a hashing function requires considerable insight into the memory access behavior of the applications that will access the cache. It is not realistically feasible to simulate all possible programs to find an optimal hashing function before the CPU is fabricated. As a result, the hashing function used for indexing memory addresses to cache memory is most likely not optimal for any one application. Having a programmable hashing function would allow the flexibility of index calculation "tuning" after the CPU has been designed and implemented. A "tuned" hashing function would then allow the cache to operate more efficiently.

This invention allows for many different possible index mappings by programming the hashing function after the CPU has been designed and implemented. By running an application many times, information may be obtained about the application cache memory behavior. With this information, a more optimal hashing function may be derived and implemented for cache indexing. In turn, this results in significant improvement in cache memory performance.

SUMMARY OF THE INVENTION

An embodiment of the invention provides a circuit and method for optimizing an index hashing function in a cache memory on a microprocessor. A programmable index hashing function is designed that allows the index hashing function to be programmed after a microprocessor has been fabricated. The index hashing function may be "tuned" by running an application on the microprocessor and observing the performance of the cache memory based on the type of index hashing function used. The index hashing function may be programmed by several methods.

Other aspects and advantages of the present invention will become apparent from the following detailed description, taken in conjunction with the accompanying drawing, illustrating by way of example the principles of the invention.

DETAILED DESCRIPTION OF THE PREFERRED EMBODIMENT

Figure 1:
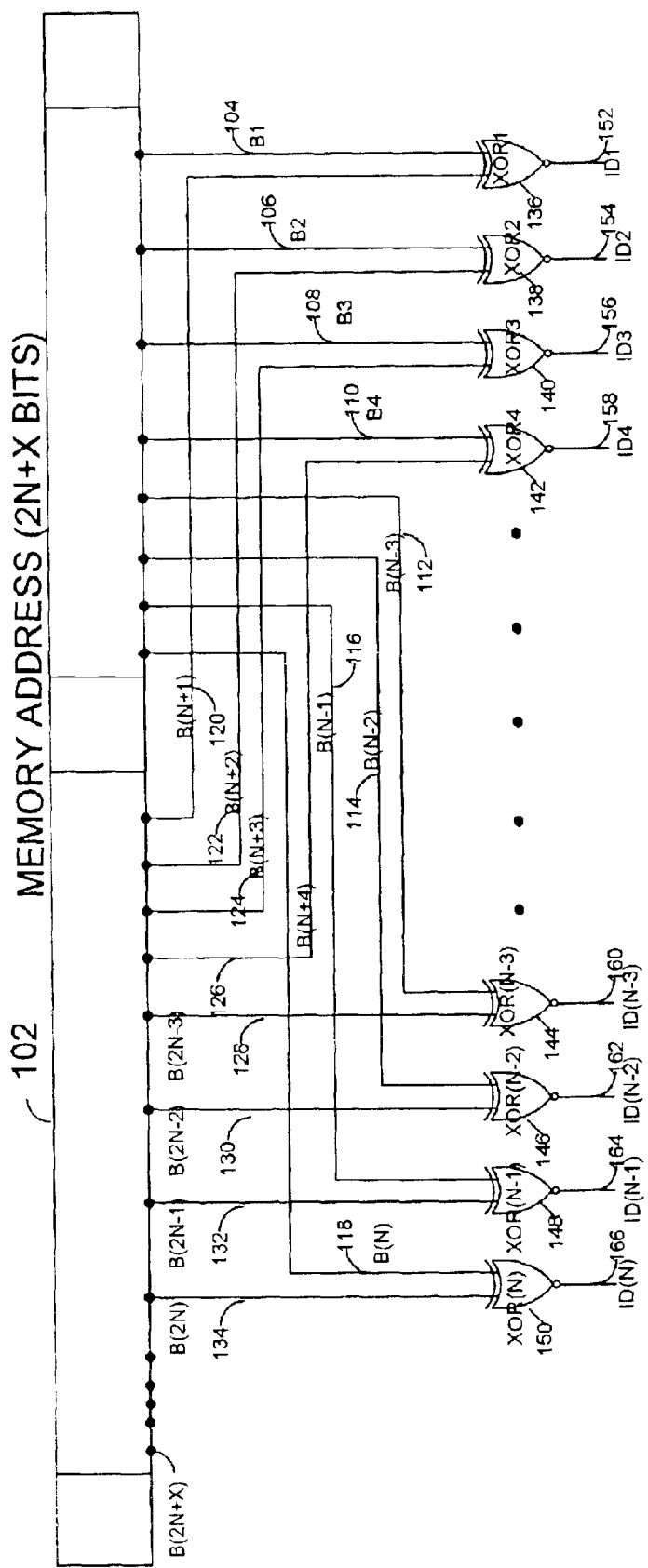
FIG. 1 is a schematic drawing of a generic index hashing function. Prior Art

FIG. 1 is a schematic drawing of an example of a index hashing function. The lower half, B(N)–B(1), 118–104, of the memory address (2N+X bits), 102 is connected to an input of each XOR of N XORs, 150–136, respectively. The upper half, B(2N)–B(N+1), 134–120, of the memory address (2N+X bits), 102, is connected to the other input of each XOR of N XORs, 150–136, respectively. The outputs of the N XORs, 150–136, form a new N-bit memory index, ID(N)–ID1, 166–152.

B1, 104, of memory address, 102 is connected to an input of XOR1, 136. B2, 106, of memory address, 102 is connected to an input of XOR2, 138. B3, 108, of memory address, 102 is connected to an input of XOR3, 140. B4, 110, of memory address, 102 is connected to an input of XOR4, 142. B(N–3), 112, of memory address, 102 is connected to an input of XOR(N–3), 144. B(N–2), 114, of memory address, 102 is connected to an input of XOR(N–2), 146. B(N–1), 116, of memory address, 102 is connected to an input of XOR(N–1), 148. B(N), 118, of memory address, 102 is connected to an input of XOR(N), 150. B(N+1), 120, of memory address, 102 is connected to an input of XOR1, 136. B(N+2), 122, of memory address, 102 is connected to an input of XOR2, 138. B(N+3), 124, of memory address, 102 is connected to an input of XOR3, 140. B(N+4), 126, of memory address, 102 is connected to an input of XOR4, 142. B(2N–3), 128, of memory address, 102 is connected to an input of XOR(N–3), 144. B(2N–2), 130, of memory address, 102 is connected to an input of XOR(N–2), 146. B(2N–1), 132, of memory address, 102 is connected to an input of XOR(N–1), 148. B(2N), 134, of memory address, 102 is connected to an input of XOR(N), 150. The outputs of XOR(N)-XOR1, 150–136, form the indexed memory address, ID(N)-ID1, 166–152, respectively.

Figure 2:
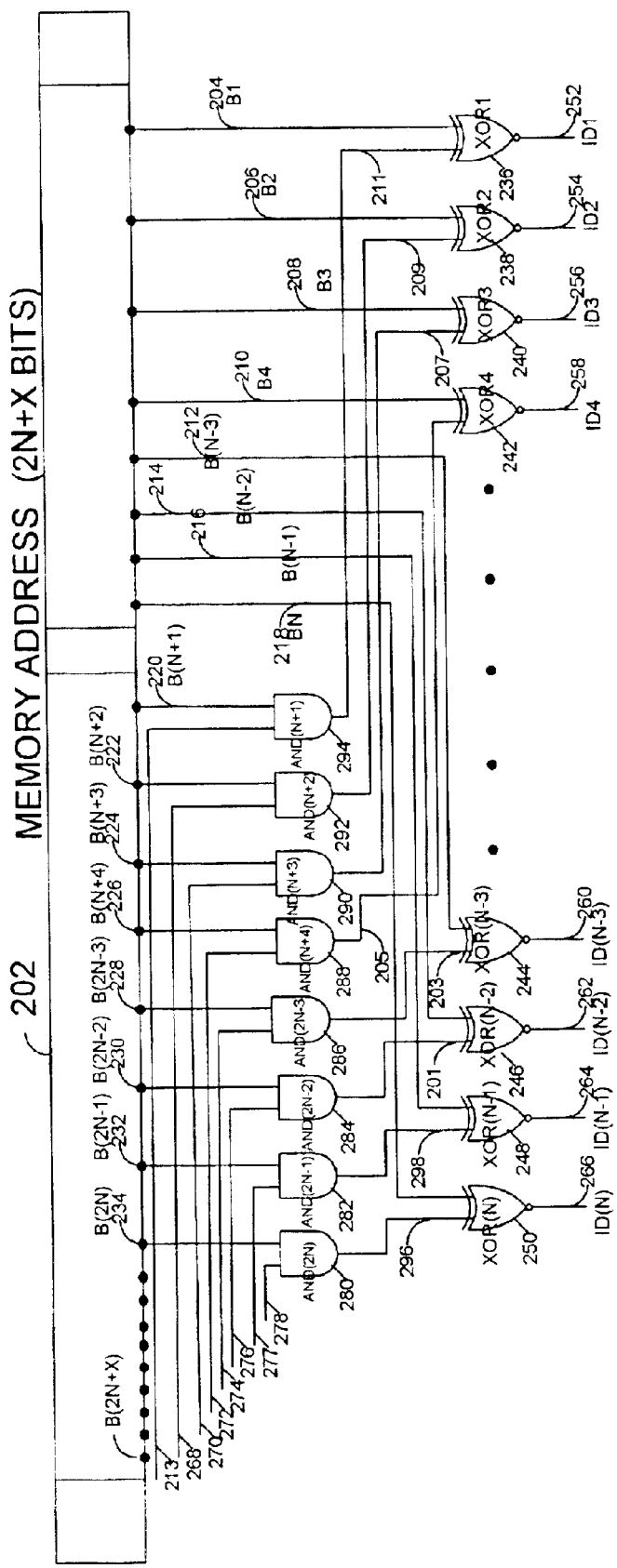
FIG. 2 is a schematic drawing of a programmable index hashing function.

FIG. 2 is a schematic drawing of one example of a programmed hashing function. In this example, the bits of the upper half, B(2N)-B(N+1), of memory address, 202, (2N+X bits) are each connected to an input of AND gates, AND(2N)-AND(N+1) respectively. The other input of AND gates, AND(2N)-AND(N+1), are connected to programmable nodes, 278–268, 213, respectively. The programmable nodes, 278–268, 213 may be programmed after a microprocessor is fabricated to improve the performance of the hashing function. The outputs of AND gates, AND(2N)-AND(N+1), 296, 298, 201–211, are connected to an input of each XOR gate, XOR(N)-XOR1, 250–236 respectively. The memory address bits B(N)-B1, 218–204, are connected to a second input of each XOR gate, XOR(N)-XOR1, 250–236, respectively. The outputs, ID(N)-ID1, 266–252, of XOR gates, XOR(N)-XOR1, 250–236, form the N-bit indexed memory address.

B1, 204, of memory address, 202 is connected to an input of XOR1, 236. B2, 206, of memory address, 202 is connected to an input of XOR2, 238. B3, 208, of memory address, 202 is connected to an input of XOR3, 240. B4, 210, of memory address, 202 is connected to an input of XOR4, 242. B(N−3), 212, of memory address, 202 is connected to an input of XOR(N−3), 244. B(N−2), 214, of memory address, 202 is connected to an input of XOR(N−2), 246. B(N−1), 216, of memory address, 202 is connected to an input of XOR(N−1), 248. B(N), 218, of memory address, 202 is connected to an input of XOR(N), 250. B(N+1), 220, of memory address, 202 is connected to an input of AND(N+1), 294. B(N+2), 222, of memory address, 202 is connected to an input of AND(N+2), 292. B(N+3), 224, of memory address, 202 is connected to an input of AND(N+3), 290. B(N+4), 226, of memory address, 202 is connected to an input of AND(N+4), 288. B(2N−3), 228, of memory address, 102 is connected to an input of AND(2N−3), 286. B(2N−2), 230, of memory address, 202 is connected to an input of AND(2N−2), 284. B(2N−1), 232, of memory address, 202 is connected to an input of AND(2N−1), 282. B(2N), 234, of memory address, 202 is connected to an input of AND(N), 280. Node 213 may be programmed to a logical "high" or "low" and is connected to a second input of AND(N+1), 294. Node 268 may be programmed to a logical "high" or "low" and is connected to a second input of AND(N+2), 292. Node 270 may be programmed to a logical "high" or "low" and is connected to a second input of AND(N+3), 290. Node 272 may be programmed to a logical "high" or "low" and is connected to a second input of AND(N+4), 288. Node 274 may be programmed to a logical "high" or "low" and is connected to a second input of AND(2N−3), 286. Node 276 may be programmed to a logical "high" or "low" and is connected to a second input of AND(2N−2), 284. Node 277 may be programmed to a logical "high" or "low" and is connected to a second input of AND(2N−1), 282. Node 278 may be programmed to a logical "high" or "low" and is connected to a second input of AND(2N), 280. The output, 211, of AND(N+1), 294, is electrically connected to a second input of XOR1, 236. The output, 209, of AND(N+2), 292, is electrically connected to a second input of XOR2, 238. The output, 207, of AND(N+3), 290, is electrically connected to a second input of XOR3, 240. The output, 205, of AND(N+4), 288, is electrically connected to a second input of XOR4, 242. The output, 203, of AND(2N−3), 286, is electrically connected to a second input of XOR(N−3), 244. The output, 201, of AND(2N−2), 284, is electrically connected to a second input of XOR(N−2), 246. The output, 298, of AND(2N−1), 282, is electrically connected to a second input of XOR(N−1), 248. The output, 296, of AND(2N), 280, is electrically connected to a second input of XOR(N), 250. The outputs of XOR(N)-XOR1, 250–236, form the indexed memory address, ID(N)-ID1, 266–252, respectively.

Other logic gates with programmable inputs may be used in place of the AND gates, AND(2N)-AND(N+1), 280–294, used in FIG. 2, to achieve a programmable hashing function.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A circuit for programming a hashing function comprising:

a set of N AND gates, wherein each AND gate in said set of N AND gates has two inputs and one output;

a set of N XOR gates, wherein each XOR gate in said set of N XOR gates has two inputs arid one output;

a N-bit hashing mask, wherein each bit in said hashing mask is programmable;

a 2N+X bit memory address;

wherein each bit from a first set of N bits from said 2N+X bit memory address is individually electrically connected to a first input of each AND gate respectively from said set of N AND gates;

wherein each bit of said N-bit hashing mask is individually electrically connected to a second input of each AND gate respectively from said set of N AND gates;

wherein each output of each AND gate from said set of N AND gates is individually electrically connected to a first input of each XOR gate respectively from said set of N XOR gates;

wherein each bit from a second set of N bits from said 2N+X memory address is individually electrically connected to a second input of each XOR gate respectively from said set of N XOR gates.

2. The circuit as in claim 1 wherein said hashing mask is programmed using EEPROMs.

3. The circuit as in claim 1 wherein said hashing mask is programmed using EPROMs.

4. The circuit as in claim 1, wherein said hashing mask is programmed using electrically blown fuses.

5. The circuit as in claim 1 wherein said hashing mask is programmed using laser blown fuses.

6. The circuit as in claim 1 wherein said hashing mask is programmed using remote diagnostic registers.

7. (Original) The circuit in claim 1 wherein said AND gates and said XOR gates are designed using static CMOS.

8. The circuit in claim 1 wherein said AND gates and said XOR gates are designed using dynamic CMOS.

* * * * *